April 26, 1966 J. G. TOMKINSON 3,248,605
CAPACITOR CHARGE MONITORING AND CONTROLLING APPARATUS
Filed Aug. 27, 1962
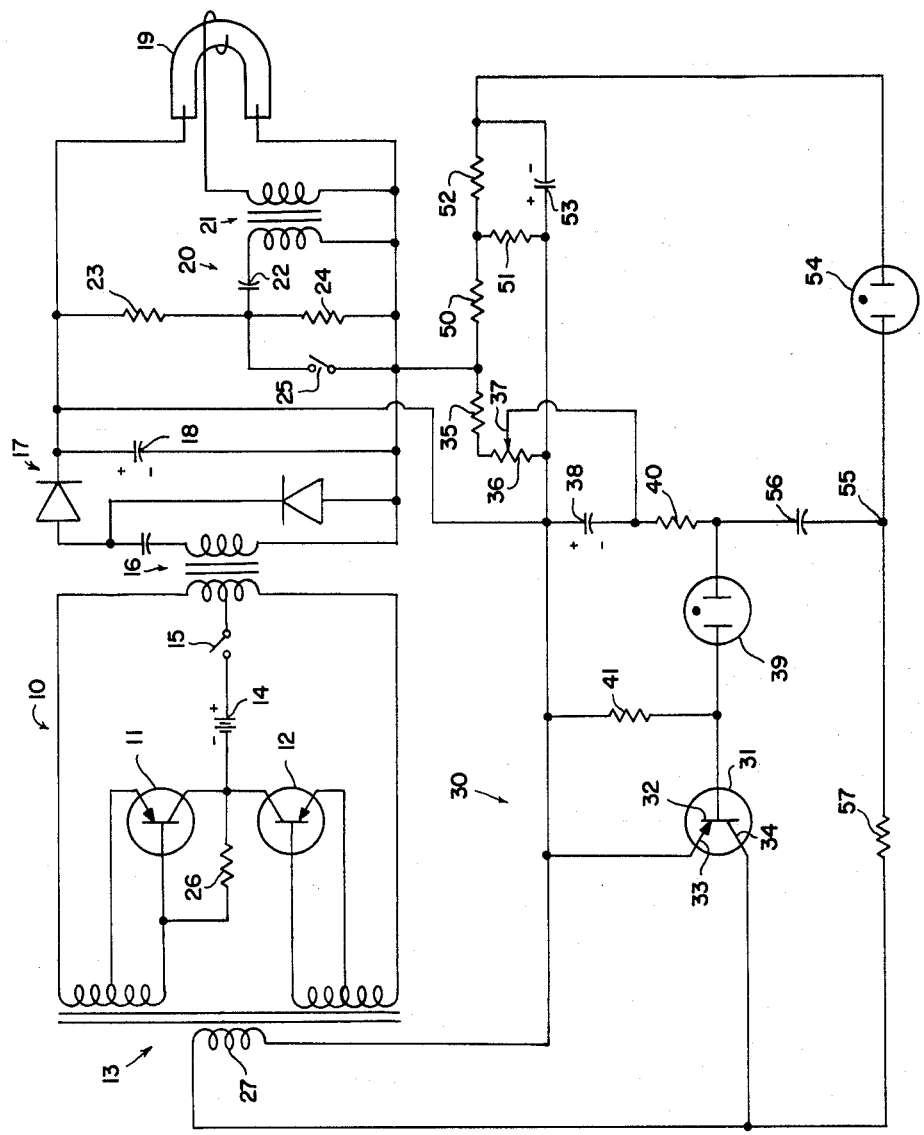
INVENTOR.
JOHN G. TOMKINSON
BY
ATTORNEY

United States Patent Office 3,248,605
Patented Apr. 26, 1966

3,248,605
CAPACITOR CHARGE MONITORING AND CONTROLLING APPARATUS
John G. Tomkinson, Denver, Colo., assignor to Honeywell Inc., a corporation of Delaware
Filed Aug. 27, 1962, Ser. No. 219,507
6 Claims. (Cl. 315—241)

This application is concerned with an improved photographic flash apparatus and particularly with an electronic photographic flash apparatus in which an oscillator, energized from a low voltage battery, is effective, through the medium of a rectifying circuit, to charge a high voltage capacitor, which capacitor is in turn connected to a gas-filled photographic flashtube. Triggering means, normally controlled by the shutter switch of an associated photographic camera, is selectively effective to produce a starting arc discharge within the photographic flashtube. This arc discharge initiates the discharge of the high voltage capacitor, through the flashtube, to produce a brilliant flash of light in synchronism with the actuation of the shutter of the associated camera.

Advances in the art have provided voltage monitor systems constructed and arranged to be sensitive to the state of charge of the high voltage capacitor and to cyclically render the electronic oscillator operative and then inoperative to maintain a charge on the high voltage capacitor, with the results that a minimum amount of electrical energy is drained from the low voltage batteries which drive the oscillator, and the light output when flashed is maintained essentially constant.

For example, such a monitor circuit may be effective, once the capacitor is charged, to periodically restart the oscillator. If further charging of the capacitor is not necessary, the oscillator is immediately stopped, or quenched. It has been found however that prior art monitor circuits create a condition which may result in overcharging of the high voltage capacitor as these short restart cycles reoccur. In some cases, this overcharging may progress to the point where an explosion of the high voltage capacitor may take place.

The present invention is concerned with an improved photographic flash apparatus utilizing a monitor circuit which incorporates, as a portion thereof, a cyclically reoccurring starting voltage pulse which, because of its interconnection with portions of the electrical circuitry, is effective to establish a synchronizng pulse to maintain the oscillator in an inoperative condition, when recharging of the high voltage capacitor is not necessary, or to provide a restarting pulse for the oscillator if it is necessary at that time to recharge the high voltage capacitor to replace electrical energy which may have drained off the capacitor, for example, by virtue of various voltage divider networks connected across the capacitor, or by virtue of the inherent leakage of the capacitor.

Specifically, the present invention contemplates the use of a transistor whose output is connected to a control input to control the state of oscillation of the oscillator. The transistor has its input connected to be responsive to the state of charge of the high voltage capacitor. Thus, when the high voltage capacitor is charged to a given range of voltage values, the transistor is rendered conductive to short the control input of the oscillator and to thus render the oscillator inoperative to further charge the high voltage capacitor. A periodic restarting pulse, derived from a cyclic timing circuit, is effective to apply a restarting pulse, in a cyclic manner, to the control input of the oscillator. This pulse is, however, not effective to restart the oscillator when the transistor is in a condition indicating that there is no need for restarting the oscillator. As a further feature of the present invention, the same voltage pulse, obtained from the timer, is connected to the input of the transistor to cause periodic sampling of the voltage of the main flash capacitor in synchronism with the occurrence of the restarting pulse. If there is no need for operation of the oscillator, then the restarting pulse is shorted through the transistor and does not appear at the control input of the oscillator. In this manner, a gradual increase in the voltage of the high voltage capacitor, which may approach a dangerous value, does not result.

The present invention will be apparent to those skilled in the art upon reference to the following specification, claims, and drawings, of which the single figure is a schematic representation of my invention.

Referring to the single figure, reference numeral 10 designates generally an electronic oscillator having a pair of transistors 11 and 12 interconnected with a transformer 13 having windings constituting the input-to-output feedback means to sustain oscillation. A low voltage battery 14, in conjunction with an on-off operating switch 15, is effective to supply operating voltage for the oscillator. The output of the oscillator exists at a step-up transformer 16 whose secondary winding is connected to a voltage doubler network 17 to charge a high voltage capacitor 18, the opposite electrodes of this capacitor 18 being connected to the main current conducting electrodes of an electronic gas filled photographic flashtube 19.

Reference numeral 20 designates generally a starting or trigger means for flashtube 19 and includes a trigger transformer 21 connected in circuit with a trigger capacitor 22 which is charged from the main high voltage capacitor by virtue of a voltage divider 23–24. Capacitor 22, when charged, is adapted to be suddenly discharged through the primary of transformer 21 by virtue of a switch 25, which switch may be the shutter contacts of an associated photographic camera. A high voltage pulse thus appears at the secondary winding of transformer 21 to initiate the arc discharge within flashtube 19 and the sudden discharge of capacitor 18 through the flashtube to produce a brilliant flash of light in synchronism with the operation of switch 25.

As thus far explained, the apparatus disclosed in the single figure is a conventional photographic flash apparatus. Oscillator 10 is constructed and arranged such that initial closing of switch 15 generates transient voltage conditions to insure that transistor 11 becomes conductive. A resistor 26 is connected into the circuit to provide an initial forward biasing current for transistor 11. The magnitude of current conduction of transistor 11 continues until the transistor is saturated, whereupon the collapsing magnetic field of transformer 13 causes the conduction to switch to transistor 12. Thus, a condition of oscillation of oscillator 10 is sustained.

To control oscillator 10, a control means in the form of winding 27 is provided. Winding 27, when shorted, is effective to load transformer 13, and thus load the feedback, to the extent that the oscillation of oscillator 10 is stopped or quenched. Furthermore, oscillator 10 is constructed and arranged so that once the oscillator is quenched, it remains in a quenched condition until a restarting pulse of voltage is applied to winding 27. This restarting pulse of voltage produces voltage transients within transformer 13 to cause one or the other of the transistors 11 and 12 to become conductive and thus again start oscillation. This restarting of oscillation is of course effective to recharge capacitor 18.

Reference numeral 30 designates generally a monitor circuit including a normally nonconducting control transistor 31 having a base electrode 32, an emitter electrode 33, and a collector electrode 34.

The electrodes 33 and 34 of transistor 31 constitute the output electrodes of the transistor and these electrodes are connected to shunt control winding 27 of the oscillator. The electrodes 32 and 33 of transistor 31 constitute the input electrodes of the transistor and these electrodes are connected to voltage responsive means, responsive to the state of charge of the high voltage capacitor 18.

Considering the voltage responsive means, a pair of resistors 35 and 36 are connected across capacitor 18 to form a voltage divider having the voltage on capacitor 18 applied to the end terminals thereof. A movable tap 37 cooperates with resistor 36, and a first capacitor 38 is connected from the movable tap 37 to the end terminal of resistor 36. Thus, capacitor 38 is charged, to the polarity indicated, to a magnitude as determined by the position of wiper 37 and the voltage of capacitor 18. Thus, the voltage on capacitor 38 can be used as a measure of the voltage on capacitor 18.

The voltage on capacitor 38 is applied to a first normally nonconductive neon voltage responsive device 39 through a circuit including a resistor 40 and a resistor 41. As the voltage on capacitor 18 gradually increases, to thus cause the voltage of capacitor 38 to likewise gradually increase, a voltage level is reached where the neon tube 39 breaks down. A forward biasing current can then be traced for transistor 31 from the positive terminal of capacitor 38 through the emitter to base circuit of transistor 31 and neon 39 to the negative terminal of capacitor 38. With transistor 31 rendered conductive, as it is by the above mentioned forward biasing current, the emitter to collector impedance of the transistor reduces to a very low value (especially when the oscillator applies a negative collector-positive emitter polarity to transistor 31) and the control winding 27 is shorted to quench oscillator 10. Further charging of capacitor 18 is thus interrupted as controlled by the firing of neon 39 in response to the increasing voltage of capacitor 38, which voltage is representative of the increased voltage on capacitor 18.

Capacitor 38 discharges over a short time period, as determined by the circuit constants of the discharge circuit, and winding 27 is shunted for this short time period to insure that oscillator 10 is quenched. The time of forward bias of transistor 31 is preferably a number of cycles of the oscillator 10 to insure that the oscillator is in fact quenched.

As above mentioned, once oscillator 10 in quenched it remains in a non-oscillating condition until it is pulsed to an oscillating condition by means of a voltage pulse applied to control winding 27. Such a control voltage pulse is provided from a timing network including elements 50-54.

The timing network includes a pair of series connected resistors 50 and 51 which are connected across the terminals of high voltage capacitor 18. In parallel with resistor 51 is the series connection of a resistor 52 and a second capacitor 53 which is charged, from capacitor 18, to the polarity indicated. The circuit constants of the circuit 50-53 are selected so that neon 54 starts blinking at a voltage value below that at which 39 blinks. Neon 54 blinks at a fast enough rate so that when 39 approaches its natural breakdown point, a pulse will be available from 54 to make 39 break down in synchronism. Neon 54 is connected from the negative terminal of capacitor 53 to a terminal 55 and thus applies a negative pulse of voltage to terminal 55. The negative pulse of voltage at terminal 55 produces two control effects. The first of the control effects is associated with a third capacitor 56 connected to the first neon 39, whereas the second control effect is by virtue of a connection including resistor 57 connected to the control winding 27 of the oscillator 10.

Considering first the effect of this negative voltage pulse as applied to neon 39 through capacitor 56, this voltage pulse aids the voltage of capacitor 38 and is effective to fire reference neon 39 which renders transistor 31 again conductive, but only if the voltage present on capacitor 38 at this time is of a magnitude indicating that it is not necessary to restart oscillator 10 to recharge capacitor 18. By way of example, timing neon 54 may be effective to apply several negative pulses of voltage to terminal 55 during the time period in which capacitor 18 remains substantially charged, and during the time period in which its voltage has not decayed below the allowable range of voltages which will produce a controlled quantity of light from flashtube 19 should switch 25 be closed at this time. However, as energy is drained from capacitor 18, by virtue of the various voltage dividers, and by virtue of the leakage current, a negative pulse will be applied to terminal 55 at a time when the voltage present on capacitor 38 is not sufficient, when combined with the negative pulse, to fire neon reference tube 39 which would render transistor 31 conductive. This is the state of conditions which indicate a need to restart oscillator 10.

A wide range of differentials between start and stop voltage may be selected by varying the amplitude of the synchronizing pulse. This may require a change in timing as well. By so doing, the turn-on point may be 450, 475 or 500 volts for a fixed turn-off of 525 volts.

With transistor 31 in a nonconductive condition at the time that a negative pulse is applied to terminal 55, this negative pulse is applied through resistor 57 and through control winding 27 to the positive terminal of capacitor 53. This voltage pulse circuit is effective to apply a restart pulse to oscillator 10 and to restart the oscillator to again effect charging of the high voltage capacitor 18. In those conditions in which transistor 31 is rendered conductive by the negative voltage pulse applied to terminal 55 (it being remembered that conduction of transistor 31 is synchronized to this negative pulse by virtue of capacitor 56 which couples the negative pulse to aid capacitor 38) the voltage pulse circuit for capacitor 53 can be traced from terminal 55 through resistor 57, and the collector to emitter circuit of transistor 31 to the positive terminal of capacitor 53. Thus, it can be seen that conduction of transistor 31 bypasses or shunts control winding 27 and prevents the negative pulse from being applied to the control winding as a restarting pulse for the oscillator.

The above operation describes the two states of the monitor circuit 30, wherein it operates to restart the oscillator, when necessary, or to prevent restarting of the oscillator, depending upon the charge on capacitor 38, which charge is indicative of the charge on the high voltage capacitor 18. From this description, it can be seen that I have provided an improved photographic flash apparatus having monitor construction, in which the restarting voltage pulse derived from capacitor 53, by virtue of the voltage reference means 54, synchronizes the operation of voltage reference means 39 to insure that oscillator 10 does not restart until capacitor 38 responds to the need for recharging of capacitor 18. Thus, overcharging of capacitor 18 is prevented. Furthermore, oscillator 10, which is restarted only when necessary, draws less energy from low voltage battery 14 to provide greater energy conservation and thus longer life of the battery.

Other modifications of this invention will be apparent to those skilled in the art and it is thus intended that the scope of my invention be limited solely by the scope of the appended claims.

I claim as my invention:

1. Electronic photographic flash apparatus comprising;
   oscillator means having a high voltage output when oscillating, and having oscillator control means to control the state of oscillation of said oscillator means,
   electrical energy storage means connected to receive electrical energy from said oscillator means when the same is oscillating,
   flashtube means connected to said energy storage means,
   a controllable current conducting device having an input, and having an output connected in controlling relation to said oscillator control means, energy quantity responsive means connected to said energy storage means and connected in controlling relation to the input of said current conducting device to cause the same to assume a first state of operation upon said energy storage means receiving a given quantity of electrical energy, to thereby place said oscillator means in a non-oscillating state, and cyclic timing means having an output connected to said oscillator control means and to the output of said current conducting device to restart oscillation of said oscillator means when said current conducting device is not in said first state of operation.

2. Photoflash power supply apparatus, comprising;
a controllable power supply having a high voltage output and having a pair of control terminals which, when loaded, render said power supply inoperative, and when subjected to a voltage pulse, render said power supply operative, capacitor means connected to be charged by the high voltage output of said power supply, a controllable current conducting device having an input and an output, means connecting the output of said current conducting device to said control terminals, menas connecting the input of said current conducting device to said capacitor means to render said current conducting device conductive when the voltage of said capacitor means is in a given range, to thus load said control terminals and render said power supply inoperative to further charge said capacitor means, timer means having a cyclic voltage pulse output, and means connecting the output of said timer means to said control terminals to render said power supply operative when said current conductive device is no longer conductive.

3. Photoflash power supply apparatus, comprising;
an electronic oscillator having feedback means normally effective to sustain oscillation of said oscillator,
a capacitor,
high voltage output means connected to said oscillator and effective to charge said capacitor when said oscillator is oscillating,
oscillator control means including said feedback means,
controllable current conducting means having an output connected to said oscillator control means to stop oscillation of said oscillator upon said current conducting means being rendered conductive,
voltage responsive means connected to be responsive to the state of charge of said capacitor and connected in controlling relation to said current conducting means to render the same conductive when the state of charge of said capacitor is within a given range of values,
oscillator starting means constructed and arranged to cyclically provide a voltage pulse,
means connecting said starting means to said oscillator control means to restart the oscillation of said oscillator when said current conducting means is not conductive,
and means connecting said starting means in controlling relation to said current conducting means to render the same conductive when the state of charge of said capacitor is within said given range.

4. In combination;
an electronic oscillator driven from a low voltage battery and providing a high voltage output to charge a capacitor when said oscillator is in an oscillating state,
a control winding for said oscillator,
a control transistor having input electrodes, and having output electrodes connected to shunt said control winding when said control transistor is conductive, said transistor normally being in a nonconductive state and effective, when conductive, to short said control winding and to control said oscillator to a non-oscillating state,
a voltage reference device connected between said capacitor and the input electrodes of said transistor, said voltage reference device being effective to render said transistor conductive upon said capacitor receiving a given charge,
a cyclic voltage source having a pulse voltage output,
and means connecting said cyclic voltage source to said control winding to place said oscillator in an oscillating state when said transistor is non-conductive.

5. Electronic photographic flash apparatus of the type having an electronic oscillator energized from a low voltage battery and providing a high voltage output to charge the high voltage capacitor which is in turn connected to a gas filled photographic flashtube, the apparatus comprising;
a control winding for the oscillator,
a control transistor having input electrodes and output electrodes,
a control capacitor connected to receive a charge from the high voltage capacitor,
a first voltage reference device connecting said control capacitor to the input electrodes of said transistor and effective upon said control capacitor receiving a given charge to render said control transistor conductive,
means connecting the output electrodes of said control transistor to said control winding to shunt said control winding when said transistor is rendered conductive and thereby place the oscillator in a non-oscillating state, wherein electrical energy is not required from the low voltage battery after the high voltage capacitor has been charged to said given charge,
a timing circuit including a further capacitor connected to the high voltage capacitor,
a further voltage reference device,
circuit means connecting said further voltage reference device in circuit with said further capacitor to periodically supply a voltage pulse to said control winding and to said first voltage reference device, said voltage pulse being effective to render said control transistor conductive under conditions wherein the charge on said control capacitor indicates there is no need to restart the oscillator, said control pulse being effective to restart the oscillator by virtue of its connection to said control winding when there is a need to restart the oscillator.

6. Photographic flash apparatus comprising;
an electronic oscillator having transformer means including input to output feedback means to sustain oscillation, and including a control winding,
high voltage output means connected to said oscillator and including a high voltage capacitor connected to a flashtube,
a first capacitor connected to said high voltage capacitor to receive a charge therefrom as said high voltage capacitor is charged by operation of said oscillator,
a control transistor having input electrodes and output electrodes,
a first voltage reference device,
circuit means connecting said first capacitor in series with said first voltage reference device to the input electrodes of said control transistor, said voltage reference device being effective upon said first capacitor receiving a given charge to provide a forward bias to the input electrodes of said control transistor to render said control transistor conductive as said first capacitor discharges through the input electrodes of said transistor, circuit means connecting the output electrodes of said control transistor to said control winding to thus shunt said control winding when said control transistor is conductive and to thereby place said oscillator in a non-oscillating condition to stop the charging of said high voltage capacitor, a second capacitor, circuit means, including said second capacitor and resistance means, connecting said second capacitor to said high voltage capacitor to charge said second capacitor, a second voltage reference device, circuit means connecting said second voltage reference device to said second capacitor and to said first capacitor and control winding, said second voltage reference device being effective to periodically discharge said second capacitor and provide a cyclically reoccurring pulse of voltage to said first voltage reference device, the polarity of said pulse of voltage being in adding relationship to the voltage on said first capacitor to thereby render said control transistor conductive when there is no need to restart the oscillator, said pulse of voltage being effective to provide a restarting pulse to said oscillator by virtue of the connection to said control winding when said control transistor remains nonconductive as an indication of a need to restart said oscillator.

References Cited by the Examiner
UNITED STATES PATENTS 2,946,924   7/1960   Gerlach et al. _____ 315—241
2,977,524   3/1961   Lingle _____ 315—241

JOHN W. HUCKERT, *Primary Examiner.*

ARTHUR GAUSS, *Examiner.*

L. ZALMAN, *Assistant Examiner.*